(12) United States Patent
Lee et al.

(10) Patent No.: US 11,074,291 B2
(45) Date of Patent: Jul. 27, 2021

(54) APPARATUS AND METHOD FOR PROVIDING IMAGE

(71) Applicant: HANWHA TECHWIN CO., LTD., Seongnam-si (KR)

(72) Inventors: Ho Woong Lee, Seongnam-si (KR); Kye Won Kim, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 0 days.

(21) Appl. No.: 16/339,708

(22) PCT Filed: Oct. 19, 2016

(86) PCT No.: PCT/KR2016/011735
§ 371 (c)(1),
(2) Date: Apr. 4, 2019

(87) PCT Pub. No.: WO2018/066742
PCT Pub. Date: Apr. 12, 2018

(65) Prior Publication Data
US 2019/0286651 A1 Sep. 19, 2019

(30) Foreign Application Priority Data

Oct. 6, 2016 (KR) .................... 10-2016-0129089

(51) Int. Cl.
*G06F 16/74* (2019.01)
*G06T 7/70* (2017.01)
(Continued)

(52) U.S. Cl.
CPC .......... *G06F 16/74* (2019.01); *G06F 3/04847* (2013.01); *G06F 16/00* (2019.01);
(Continued)

(58) Field of Classification Search
CPC .......... G06F 16/74; G06F 16/51; G06F 16/00; G06T 7/70; G06T 7/20
See application file for complete search history.

(56) References Cited

U.S. PATENT DOCUMENTS 6,988,245 B2   1/2006   Janevski
7,703,044 B2   4/2010   Graham
(Continued)

FOREIGN PATENT DOCUMENTS

KR   10-0982165       9/2010
KR   10-2010-0134610  12/2010
(Continued)

OTHER PUBLICATIONS

International Search Report dated Jul. 6, 2017, issued in International Patent Application No. PCT/KR2016/011735.

*Primary Examiner* — Roland J Casillas
(74) *Attorney, Agent, or Firm* — H.C. Park & Associates, PLC (57) ABSTRACT

Disclosed are an apparatus and method for providing an image. The image providing apparatus includes an image storage unit storing an image obtained through a camera, and a display unit including a display area for displaying the image stored in the image storage unit and a timeline area for displaying a timeline corresponding to a reproduction time of the image, and displaying a type of an event that has occurred in the image in a different color on the timeline corresponding to a time point when the event occurred.

10 Claims, 5 Drawing Sheets

(51) Int. Cl.

| | |
|---|---|
| *G06F 16/51* | (2019.01) |
| *G06F 3/0484* | (2013.01) |
| *G06K 9/00* | (2006.01) |
| *G06T 7/20* | (2017.01) |
| *H04N 9/87* | (2006.01) |
| *H04N 5/93* | (2006.01) |
| *H04N 21/482* | (2011.01) |
| *H04N 5/92* | (2006.01) |
| *G06F 16/00* | (2019.01) |
| *H04N 21/231* | (2011.01) |
| *H04N 21/433* | (2011.01) |
| *H04N 5/77* | (2006.01) |
| *G11B 27/10* | (2006.01) |
| *H04N 21/472* | (2011.01) |
| *H04N 21/431* | (2011.01) |

(52) U.S. Cl.
CPC ......... *G06F 16/51* (2019.01); *G06K 9/00228* (2013.01); *G06T 7/20* (2013.01); *G06T 7/70* (2017.01); *G11B 27/10* (2013.01); *H04N 5/77* (2013.01); *H04N 5/92* (2013.01); *H04N 5/93* (2013.01); *H04N 9/87* (2013.01); *H04N 21/231* (2013.01); *H04N 21/431* (2013.01); *H04N 21/433* (2013.01); *H04N 21/472* (2013.01); *H04N 21/482* (2013.01); *G06T 2207/30196* (2013.01)

(56) References Cited

U.S. PATENT DOCUMENTS

| | | | |
|---|---|---|---|
| 8,112,702 | B2 | 2/2012 | Badoiu et al. |
| 9,406,342 | B2 | 8/2016 | Lim et al. |
| 9,430,509 | B2 | 8/2016 | Elmqvist Wulcan et al. |
| 9,542,405 | B2 | 1/2017 | Park et al. |
| 2005/0216838 | A1* | 9/2005 | Graham .............. H04N 21/4314 715/713 |
| 2012/0262472 | A1 | 10/2012 | Garr et al. |
| 2013/0091432 | A1* | 4/2013 | Shet ...................... G06F 16/532 715/719 |
| 2014/0195916 | A1* | 7/2014 | Kwon .................. G11B 27/034 715/722 |
| 2015/0269143 | A1* | 9/2015 | Park ........................ H04N 5/91 382/305 |
| 2016/0314355 | A1* | 10/2016 | Laska ..................... G06F 3/048 |

FOREIGN PATENT DOCUMENTS

| | | |
|---|---|---|
| KR | 10-2014-0052744 | 5/2014 |
| KR | 10-2014-0089125 | 7/2014 |
| KR | 10-2015-0009047 | 1/2015 |
| KR | 10-2015-0032193 | 3/2015 |
| KR | 10-2015-0108223 | 9/2015 |
| KR | 10-2015-0109978 | 10/2015 |
| KR | 10-2016-0010218 | 1/2016 |

* cited by examiner

| Event Type | [B] Motion | [R] Audio |
| Object Count | 3 | |

APPARATUS AND METHOD FOR PROVIDING IMAGE

CROSS REFERENCE TO RELATED APPLICATION

This application is a National Stage Entry of International Application No. PCT/KR2016/011735, filed on Oct. 19, 2016, and claims priority from and the benefit of Korean Patent Application No. 10-2016-0129089, filed on Oct. 6, 2016, which are hereby incorporated by reference for all purposes as if fully set forth herein.

BACKGROUND

Field

Exemplary embodiments/implementations of the invention relate generally to an apparatus and method for providing an image, and more specifically, to an apparatus and method for providing an image and displaying in the form of a heat map on a timeline so that the type and number of occurrences of an event detected from an image obtained through a camera may be intuitively identified.

Discussion of the Background

A system for providing information about a detected event to a user when an event occurs in a captured image has been widely used. As the number of cameras connected to such a system increases, it has become important to provide event detection information through a more efficient method.

Figure 1:
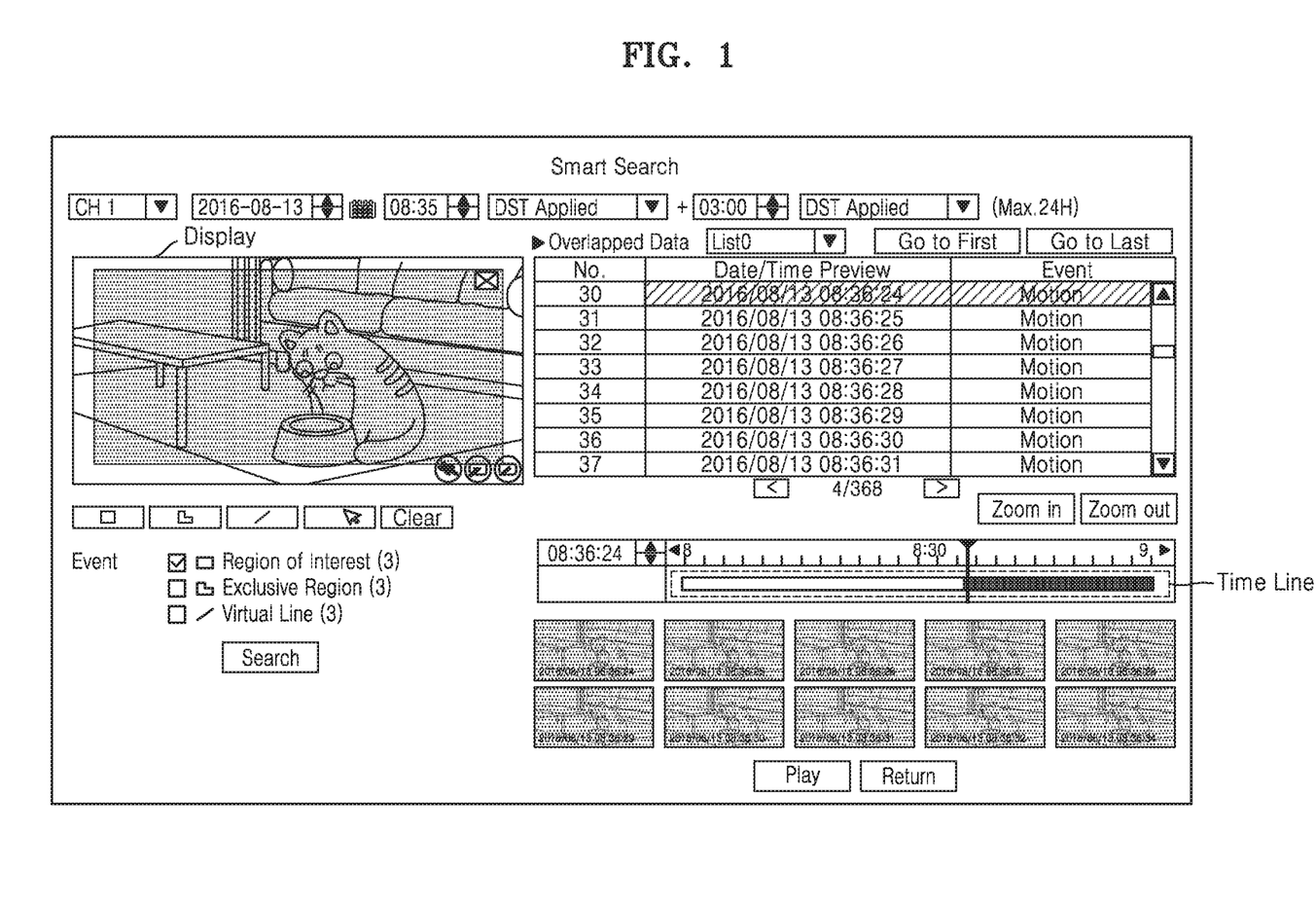
FIG. 1 schematically illustrates a configuration of an image providing apparatus according to the prior art.

FIG. 1 conceptually illustrates a user interface (UI) of an image providing apparatus according to the prior art. In a timeline included in the UI of the image providing apparatus according to the prior art, an event may be displayed in a preset color according to the type of the event at a position corresponding to the time when the event occurred so as to indicate the occurrence of an event.

In this case, when different types of events occur at the same time, an event having a relatively high priority may be displayed first based on a preset priority, and an event having a relatively low priority may be displayed through a separate setting.

When the image providing apparatus according to the prior art is used, only one event having the highest priority is displayed. Accordingly, it may be impossible to check at once how many events have occurred in a time period and may be difficult to check which type of an event has occurred.

The above information disclosed in this Background section is only for understanding of the background of the inventive concepts, and, therefore, it may contain information that does not constitute prior art.

SUMMARY

Exemplary embodiments provide an apparatus and method for providing an image, by which an event occurrence time and the type and number of occurrences of an event may be easily identified.

Additional features of the inventive concepts will be set forth in the description which follows, and in part will be apparent from the description, or may be learned by practice of the inventive concepts.

According to an aspect of the present disclosure, an image providing apparatus includes an image storage unit storing an image obtained through a camera, and a display unit including a display area for displaying the image stored in the image storage unit and a timeline area for displaying a timeline corresponding to a reproduction time of the image, and displaying a type of an event that has occurred in the image in a different color on the timeline corresponding to a time point when the event occurred.

The display unit may include an event detection module for detecting occurrence of an event from the image, and the event may include motion detection, facial detection, and a camera event.

The event detection module may receive coordinate information indicating an event occurrence position, and determine saturation or shade of the color by using the coordinate information that is accumulated.

The display unit may further include a thumbnail display area for displaying a thumbnail extracted from the image, and the thumbnail displays event information corresponding to a selected point on the timeline, in accordance with the timeline.

The thumbnail may display a position where the event occurs in a preset color or with preset shade corresponding to the type and number of occurrences of the event.

The display unit may display a thumbnail corresponding to a time period set by a user in the thumbnail display area, and display an event change pattern that has occurred during the time period in the preset color or with the preset shade.

The display unit may display the type of an event or the number of occurrences of an event by using a color or shade displayed with a pixel of an n×n size.

The display unit may further display the type of an event and a detection frequency for each event type detected during a time period set by a user.

According to an aspect of the present disclosure, an image providing apparatus includes an image storage unit storing an image obtained through a camera, and a display unit including a display area for displaying the image stored in the image storage unit and a timeline area for displaying a timeline corresponding to a reproduction time of the image, and displaying a scale selection area for changing a scale of the timeline. When the scale is equal to or less than a preset first scale, the display unit displays a color or shade corresponding to the number of events that have occurred in the image at an event occurrence position on the timeline. When the scale is greater than the first scale, the display unit displays types of events that have occurred in the image in different colors on the timeline corresponding to time points when the events occurred.

The display unit may include an event detection module for detecting occurrence of an event from the image, and the event may include motion detection, facial detection, and a camera event.

The event detection module may receive coordinate information indicating an event occurrence position, and determine saturation or shade of the color by using the coordinate information that is accumulated.

The display unit may further include a thumbnail display area for displaying a thumbnail extracted from the image, and the thumbnail may display event information corresponding to a selected point on the timeline, in accordance with the timeline.

The thumbnail may display a position where the event occurs in a preset color or with preset shade corresponding to the type and number of occurrences of the event.

The display unit may display a thumbnail corresponding to a time period set by a user in the thumbnail display area, and display an event change pattern that has occurred during the time period in the preset color or with the preset shade.

The display unit may display the type of an event or the number of occurrences of an event by using a color or shade displayed with a pixel of an n×n size.

The display unit may further display the type of an event and a detection frequency for each event type detected during a time period set by a user.

According to an aspect of the present disclosure, an image providing method using an image providing apparatus including a display area for reproducing an image and a timeline corresponding to a reproduction time of the image, includes detecting an event from the image, determining a type and number of occurrences of a detected event, and displaying, in different colors, types of events that have occurred in the image on the timeline corresponding to time points when the events have occurred.

The image providing method may further include displaying a thumbnail extracted from the image, wherein the thumbnail displays event information corresponding to a selected point on the timeline, in accordance with the timeline.

The thumbnail may display a position where the event occurs in a preset color or with preset shade corresponding to the type and number of occurrences of the event.

In the displaying of the thumbnail, a thumbnail corresponding to a time period set by a user may be displayed, and an event change pattern that has occurred during the time period may be displayed in the preset color or with the preset shade.

According to the present disclosure, an apparatus and method for providing an image may facilitate identification of the time at which an event occurred, and the type and number of occurrences of an event.

It is to be understood that both the foregoing general description and the following detailed description are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
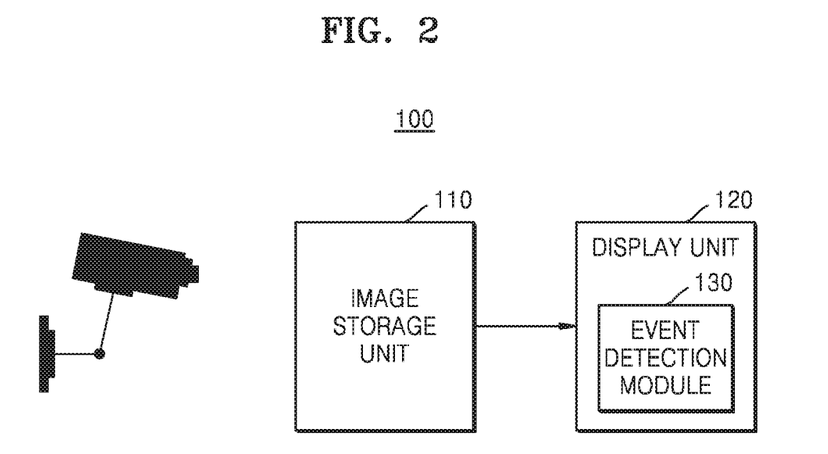
FIG. 2 schematically illustrates a configuration of an image providing apparatus according to an embodiment of the present disclosure.

FIG. 2 schematically illustrates a configuration of an image providing apparatus according to an embodiment of the present disclosure.

Referring to FIG. 2, an image providing apparatus 100 according to an embodiment of the present disclosure may include an image storage unit 110 and a display unit 120. The image storage unit 110 stores an image obtained through a camera. The display unit 120 may include a display area and a timeline area. The display unit 120 may provide a user interface (UI) which enables a user to play an image stored in the image storage unit 110 and check information about an image being played.

The display area displays the image stored in the image storage unit 110, and the timeline area displays a timeline corresponding to a reproduction time of the image.

The display unit 120 displays the types of events occurring in the image and the number of occurrences of the event in different colors on the timeline corresponding to an occurrence time point of the event.

For example, when two different types of events occur at a first time point of an image reproduced in the display area, the display unit 120 may display the two different types of events at a position corresponding to the first time point on the timeline. In this state, the two different types of events may be displayed in different colors.

In another example, when one event occurs at a second time point of the image and three events occur at a third time point, the display unit 120 may display a color indicating the one event at a position corresponding to the second time point, and a color indicating the three events at a position corresponding to the third time point.

In this state, when the total of four events are of the same type, the colors indicating the respective events are the same, and the color displayed at the position corresponding to the third time point may have saturation higher than that of the color displayed at the position corresponding to the second time point.

Alternatively, when the occurrence of an event is displayed with shade on the timeline, the position corresponding to the third time point may be displayed darker.

The display unit 120 may include an event detection module 130. The event detection module 130 detects the occurrence of an event in the image. The event detected by the event detection module 130 may include motion detection (MD), facial detection (FD), and a camera event.

The MD denotes a motion of an object detected from the image. When a motion exceeding a preset motion degree is detected, the event detection module 130 may determine that an event has occurred.

The FD denotes that a facial area of a human is detected from the object detected from the image. When a human face is detected from the image, the event detection module 130 may determine that an event has occurred. Furthermore, when there is human face data that is previously stored in a separate storage medium (not shown), information about a person corresponding to the detected facial area may be tagged.

The camera event denotes an event about a motion of the object passing a specific position, and may include an event such as entering, passing, and people counting.

Figure 3A:
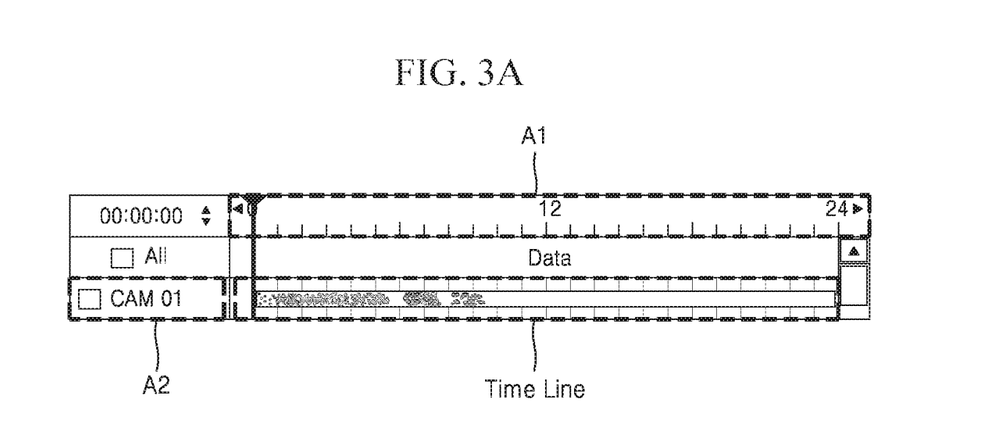
FIG. 3A illustrates an example of a timeline included in an image providing apparatus according to an embodiment of the present disclosure, and FIG. 3B provides an enlarged view thereof.
Figure 3B:
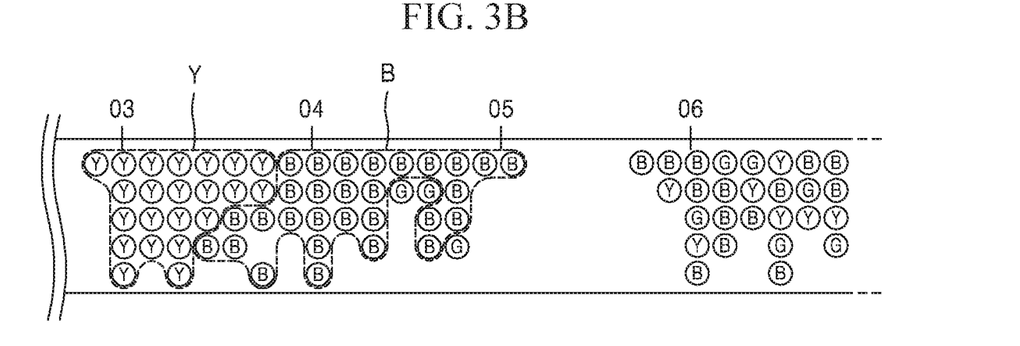

FIG. 3 illustrates an example of a timeline included in an image providing apparatus according to an embodiment of the present disclosure.

As described above with reference to FIG. 2, the display unit 120 displays an event in a color at a position on the timeline correspond to a time point when an event occurred. FIG. 3A illustrates a timeline area included in the display unit 120, and the timeline area may display a timeline, a time A1, and a camera identification number A2.

The time A1 denotes a time when the image reproduced in the display area of the display unit 120 is obtained, and in general may be displayed from 0 to 24 o'clock. The camera identification number A2 denotes an identification number of a camera that captured the currently reproduced image. When images are obtained from different places by using a plurality of cameras, identification numbers of the cameras may be displayed, and a plurality of timelines may be displayed corresponding to the respective cameras.

FIG. 3B illustrates a partial area of the timeline by enlarging the same, for example, events detected for about three hours from 3 a.m.

Referring to FIG. 3B, a color indicating each event is displayed on the timeline at a time point when the event occurred. The display unit 120 may display the type and number of occurrences of an event by using a color displayed with a pixel of an n×n size.

In FIG. 3B, a motion event is displayed in blue B, a schedule event is displayed in green G, and a sensor event is displayed in yellow Y. Furthermore, it may be seen from the timeline that sensor events intensively occurred at around 3 a.m. and a plurality of motion events occurred for about one hour from about 4 a.m. Also, it may be seen that motion events, schedule events, and sensor events occurred multiple times for about one hour from about 6 a.m.

As the events are displayed by using the timeline as illustrated in FIG. 3, the image providing apparatus 100 according to the present disclosure provides an effect that a user may check, at a glance, the time point when an event occurred and the type and number of occurrences (or occurrence frequency) of the event.

The display unit 120 may display the occurrence of an individual event by using a pixel of a 1×1 size. The color displayed through one pixel indicates one event, and when five events occurred at the same time point, the display unit 120 may display the occurrences of the events in colors displayed through five individual pixels on the timeline corresponding to the same time point, regardless of the sameness of the type of the events. Furthermore, as individual pixels denote that individual events that are distinguished from each other have occurred, the individual pixels may be displayed not to overlap each other.

When the number of events that have occurred at the same time point exceeds a certain number, pixels or colors indicating individual events may be displayed on the timeline to overlap each other. As the number of pixels displayed to overlap each other increases, the user may see that the event has frequently occurred.

Figure 4:
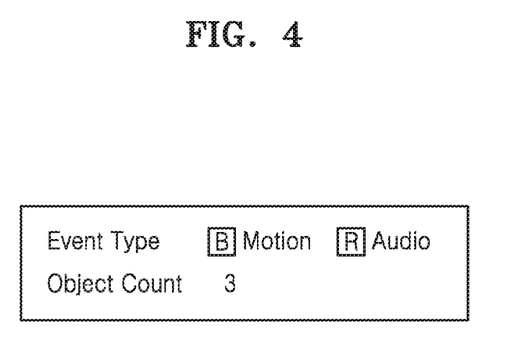
FIG. 4 illustrates an example of a method of providing the type and number of occurrences of an event provided through an image providing apparatus according to an embodiment of the present disclosure.

FIG. 4 illustrates an example of a method of providing the type and number of occurrences of an event provided through an image providing apparatus according to an embodiment of the present disclosure.

The display unit 120 may further display the type of an event detected during a time period set by the user, and a detection frequency for each event type. FIG. 4 illustrates that motion events and audio events are detected a total of three times.

In FIG. 4, the motion event may be displayed with an icon displayed in blue B, and the audio event may be displayed with an icon displayed in red R. The information illustrated in FIG. 4 may be displayed with the timeline illustrated in FIG. 3, and events of the same type are displayed in the same color on the timeline and the example of FIG. 4.

When the user sets a time period for one minute from 6 a.m., the display unit 120 may display the type and number of occurrences of an event occurred for the one minute as illustrated in FIG. 4. Although FIG. 4 displays a sum of the number of occurrences of the motion event and the audio event, this is merely an embodiment, and the number of occurrences of the respective events may be separately displayed.

The user may directly input a time period to check the occurrence of an event, or set the time period on the timeline through an action such as a mouse drag.

Figure 5:
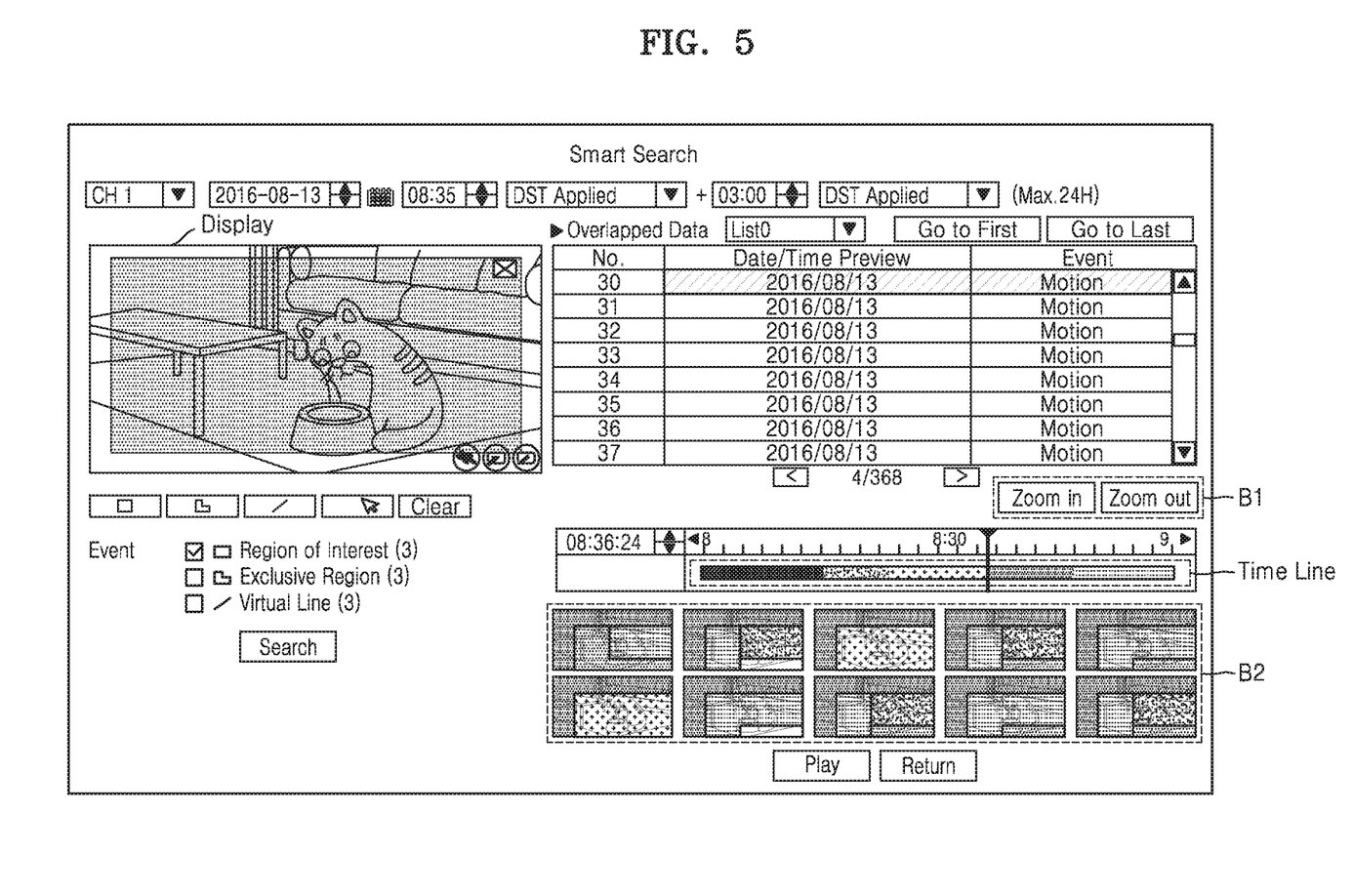
FIG. 5 illustrates an example of a thumbnail provided through an image providing apparatus according to another embodiment of the present disclosure.

FIG. 5 illustrates an example of a thumbnail provided through an image providing apparatus according to another embodiment of the present disclosure.

Referring to FIG. 5, in an image providing apparatus according to another embodiment of the present disclosure, the display unit 120 may further include a thumbnail display area B2 for displaying a thumbnail extracted from an image.

The thumbnail in accordance with the timeline may display event information corresponding to a selected point on the timeline.

In FIG. 5, thumbnails illustrated in the thumbnail display area B2 may be understood as a group of thumbnails corresponding to a time point selected by the user. FIG. 5 illustrates an example in which the user selects a time point of 8:35 a.m. An information window displaying a time point when an event occurred and the type of the event occurred may be disposed at the right side of the display area (Display). FIG. 5 illustrates an example in which the user selects a motion event.

In an embodiment, when the user selects a point on the timeline, the display unit 120 may display one or more thumbnails corresponding to the selected point in the thumbnail display area B2. In this state, thumbnails extracted for one minute before and after the selected point and including the selected time point may be displayed.

Accordingly, the thumbnails displayed in the thumbnail display area B2 may be understood to correspond to different time points, displaying images extracted for the one minute.

A time period for extracting and displaying thumbnails may be preset. The thumbnails may display a position where an event selected by the user occurred by using a preset color or preset shade corresponding to the number of occurrences of the event, and the event occurred in an image being reproduced.

Referring to FIG. 5, the thumbnails displayed in the thumbnail display area B2 display with shade areas where a motion event occurs at each time point. In this state, a portion where a degree of motion is strong may be displayed thickly, and a portion where a degree of motion is weak may be displayed thinly. Alternatively, a portion having a high event occurrence frequency may be displayed thickly, and a portion having a low event occurrence frequency may be displayed thinly.

FIG. 5 illustrates an example in which the user checks a motion event, in which the strength or occurrence frequency of an event may be indicated by using a color, for example, blue, corresponding to the motion event.

In other words, a portion having a high degree of motion or a high number of occurrences of the event may be displayed in blue with high saturation, whereas a portion having a low degree of motion or a low number of occurrences of the event may be displayed in blue with low saturation.

Similarly, a portion having a high degree of motion or a high number of occurrences of the event may be displayed in a color close to red, whereas a portion having a low degree of motion or a low number of occurrences of the event may be displayed in a color close to blue.

Through the thumbnail displayed in the above method, the user may check at a glance the number of occurrences (or occurrence frequency) of the event selected by the user in a specific time period.

In another embodiment, when a "PLAY" button displayed in a lower portion of the thumbnail display area B2 is selected, the thumbnails displayed in the thumbnail display area B2 may be continuously reproduced in order of time.

In this state, as the continuously reproduced thumbnails include color or shade information without change, the continuously reproduced thumbnails may provide an effect that the user may efficiently check a change pattern in the position where the selected event occurs.

In another embodiment of the present disclosure, the event detection module 130 may receive coordinate information indicating an event occurrence position, and determine color saturation or the shade corresponding to each event by using the coordinate information that is accumulated.

The coordinate information of the event occurrence position may be obtained by a camera that captures an image including the event and stored in the image storage unit 110 as meta data. The event detection module 130 may receive the coordinate information, classify the coordinate information at the portion where the event occurred based on the type of the event, and calculate a value by accumulating the types of events corresponding to the respective pieces of coordinate information.

The event detection module 130 may determine the coordinates of an event occurred by using the value that is accumulated, determine which type of events that have occurred at the respective coordinates, and how many times each event occurred.

When no event is detected in an operation of capturing an image, vector information is analyzed while decoding the image stored in the image storage unit 110, and thus the occurrence of an event may be determined. The color saturation or the shade corresponding to each event may be determined by using coordinate information of a position where an event occurs.

Figure 6:
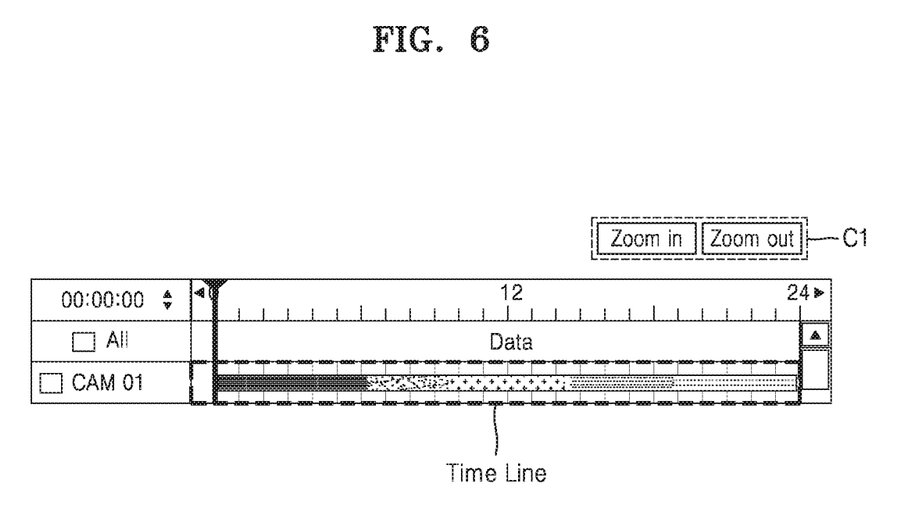
FIG. 6 illustrates an example of a timeline included in an image providing apparatus according to another embodiment of the present disclosure.

FIG. 6 illustrates an example of a timeline included in an image providing apparatus according to another embodiment of the present disclosure.

The image providing apparatus according to another embodiment of the present disclosure, as described with reference to FIG. 2, may include an image storage unit and a display unit. The image storage unit and the display unit perform substantially the same functions that are described above, and detailed descriptions thereof are omitted.

In another embodiment of the present disclosure, the display unit may include a display area, a timeline area, and further a scale selection area C1. When the scale is equal to or less than a preset first scale, the display unit displays the color or shade corresponding to the number of events occurring in an image reproduced in the display area, at an event occurrence position on the timeline.

The scale selection area C1, as illustrated in FIG. 6, may include a zoom-in button and a zoom-out button. The timeline in FIG. 6 is illustrated in a state of capable of displaying the occurrences of events for 24 hours. When the zoom-in button is selected, a time period displayed on the timeline decreases.

For example, whenever the zoom-in button is selected once, the time period displayed on the timeline decreased by 50%. In the example of FIG. 6, when the zoom-in button is selected once, the timeline may be changed to a state of capable of displaying the occurrences of events for 12 hours.

Furthermore, the timeline area and the area where time is displayed are draggable, and when a time period shorter than 24 hours is displayed, events occurring in the time period that is not displayed may be checked by dragging the area to the left and right.

Referring to FIG. 6, the timeline displays information about events occurred for 24 hours, and as described above, the occurrence of an event is displayed in the color or with shade corresponding to the number of events.

FIG. 6 illustrates an embodiment in which the number of events is displayed with shade, in which it may be seen that a time period is displayed most thickly for about 6 hours from 0 o'clock. It may be seen that a time period from about 19 o'clock to 24 o'clock is most thinly displayed. In other words, it may be seen that a large number of events have occurred for 6 hours from 0 o'clock and a small number of events have occurred for about 5 hours from 19 o'clock to 24 o'clock.

Furthermore, the number of events may be displayed in color. As the number of events occurred decreases, the events may be displayed in a color close to blue. As the number of events occurred increases, the events may be displayed in a color close to red.

The display of events on the timeline by using a color or shade corresponding to the number of events may be limited to a case when a scale is set to be equal to or less than a preset first scale. The scale may denote a display range of time displayed corresponding to the timeline. The user may change the scale by using the zoom-in or zoom-out button in the scale selection area C1.

As described above, when the zoom-in button is selected, a time period shorter than the currently displayed time period is displayed. In the present specification, it is described that, when the zoom-in button is selected, the timeline is scaled-up, and when the zoom-out button is selected, the timeline is scaled-down.

When the zoom-in button is selected for scale-up so that the scale increases greater than the first scale, the display unit displays in different colors the type of an event occurring in an image on the timeline corresponding to the time point when the event occurred.

In other words, when the scale is greater than the first scale, as described above with reference to FIG. 3, the type of the event occurred may be displayed in detail by using the timeline.

When the occurred individual events are displayed one by one, as the number of events that have occurred increases, colors are blended and overlapped with each other so that it may be difficult to find in detail what event has occurred. Accordingly, in this case, when the number of events that have occurred in a total time period, for example, 24 hours, is equal to or less than a preset scale, only the occurrence frequency of the events may be displayed considering only the number of events occurred, regardless of the type of an event.

When the user desires to check information of a specific time period in detail by selecting the specific time period, the user may perform the scale-up by selecting the zoom-in button. In this state, the display unit may display the type of an event, as illustrated in FIG. 3.

Figure 7:
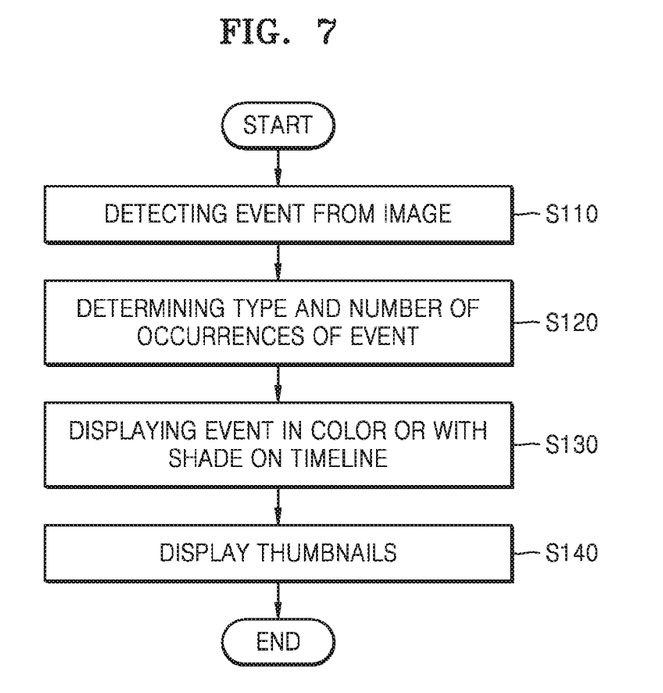
FIG. 7 is a flowchart schematically showing a flow of an image providing method according to an embodiment of the present disclosure.

FIG. 7 is a flowchart schematically showing a flow of an image providing method according to an embodiment of the present disclosure.

Referring to FIG. 7, the image providing method according to an embodiment of the present disclosure, which uses an image providing apparatus including a display area for reproducing an image and a timeline corresponding to a reproduction time of the image, may include detecting an event from an image (S110), determining the type and number of occurrences of an event (S120), and displaying an event in color or with shade on the timeline (S130).

In the detecting of the event (S110), an event is detected from an image captured by a camera, and the detected event may include a MD, a FD, and a camera event.

The MD may denote a motion of the object detected from the image. In the detecting of the event (S110), when a motion exceeding a preset degree of motion is detected, an event is determined to occur.

The FD may denote that a facial area of a human is detected from the object detected from the image. In the detecting of the event (S110), when a human face is detected from the image, the event may be determined to occur. When there is human face data that is previously stored in a separate storage medium (not shown), information about a person corresponding to the detected facial area may be tagged.

The camera event denotes an event about a motion of the object passing a specific position, and may include an event such as entering, passing, and people counting.

Each event may be detected by the camera for capturing the image, or may be detected by using vector information generated in a decoding process for reproduction after storing the image.

In the determining of the type and number of occurrences of an event (S120), the type and number of occurrences of the event detected in the event detection operation (S120) is determined. When an event is detected, coordinate information about a position where the event is detected and the type of the event occurred may be accumulatively stored, and the type of an event detected and the number of occurrences according to the type of an event may be determined by using the stored number that is accumulated.

In the displaying (S130), the type of the event occurred in the image is displayed in a different color on the timeline corresponding to the time point when the event occurred.

The image providing apparatus used in the image providing method according to the present disclosure, as illustrated in FIG. 2, may provide a UI including the display area and the timeline area.

In the displaying (S130), the type and number of occurrences of the event occurred in the image is displayed in different colors on the timeline corresponding to the time point when the event occurred.

For example, when two different types of events occur at the first time point of an image being reproduced in the display area, the two different types of events may be displayed at a position corresponding to the first time point on the timeline. In this state, the two different types of events may be displayed in different colors.

In another example, when one event occurs at the second time point of the image and three events occur at the third time point, the one event may be displayed in a color at a position corresponding to the second time point, and the three events may be displayed in a color at a position corresponding to the third time point.

In this state, when the total of four events are of the same type, the colors indicating the respective events are the same, and the color displayed at the position corresponding to the third time point may have saturation higher than that of the color displayed at the position corresponding to the second time point.

Alternatively, when the occurrence of an event is displayed with shade on the timeline, the position corresponding to the third time point may be displayed thicker.

The image providing method according to another embodiment of the present disclosure may further include displaying a thumbnail. The thumbnail extracted from the image may display, in accordance with the timeline, event information corresponding to a selected point on the timeline. The thumbnail may display a position where the event occurs in preset color or with preset shade corresponding to the type and number of occurrences of an event.

Furthermore, in the displaying of the thumbnail, a thumbnail corresponding to the time period set by the user, and an event change pattern occurred during the time period may be displayed in color or with shade.

As described with reference to FIG. 5, when the user selects a certain time point on the timeline, in the displaying of the thumbnail, one or more thumbnails corresponding to the selected time point may be displayed in the thumbnail display area B2. In this state, thumbnails extracted for one minute before and after the selected time point and including the selected time point.

Accordingly, the thumbnails displayed in the thumbnail display area B2 may be understood to correspond to different time points and to display an image included in the one minute.

The time period to extract and display a thumbnail may be preset, and the thumbnails may display position where an event selected by the user occurred by using a preset color or preset shade corresponding to the number of occurrences of the event, and the event occurred in an image being reproduced.

Referring to FIG. 5, the thumbnails displayed in the thumbnail display area B2 displays an area where a motion event occurs, with shade, at each time point. In this state, a portion where a degree of motion is strong may be displayed thickly, and a portion where a degree of motion is weak may be displayed thinly. Alternatively, a portion having a high event occurrence frequency may be displayed thickly, and a portion having a low event occurrence frequency may be displayed thinly.

FIG. 5 illustrates an example in which the user checks a motion event, in which the strength or occurrence frequency of an event may be indicated by using a color, for example, blue, corresponding to the motion event.

In other words, a portion having a high degree of motion or a high number of occurrences of the event may be displayed in blue with high saturation, whereas a portion having a low degree of motion or a low number of occurrences of the event may be displayed in blue with low saturation.

Similarly, a portion having a high degree of motion or a high number of occurrences of the event may be displayed in a color close to red, whereas a portion having a low degree of motion or a low number of occurrences of the event may be displayed in a color close to blue.

Through the thumbnail displayed in the above method, the user may check at a glance the number of occurrences (or occurrence frequency) of the event selected by the user in a specific time period.

In another embodiment, when a "PLAY" button displayed in a lower portion of the thumbnail display area B2 is selected, the thumbnails displayed in the thumbnail display area B2 may be continuously reproduced in order of time.

In this state, as the continuously reproduced thumbnails include color or shade information without change, the continuously reproduced thumbnails may provide an effect that the user may efficiently check a change pattern in the position where the selected event occurs.

Some of the advantages that may be achieved by exemplary implementations/embodiments of the invention and/or exemplary methods of the invention include an apparatus and method for providing an image that may facilitate identification of the time at which an event occurred, and the type and number of occurrences of an event.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

The invention claimed is:

1. An image providing apparatus comprising:
an image storage unit configured to store an image obtained through a camera; and
a display unit comprising a display area configured to display the image stored in the image storage unit and a timeline area configured to display a timeline corresponding to a reproduction time of the image, and display a type of an event that has occurred in the image in a different color on the timeline corresponding to a time point when the event occurred, wherein:
the display unit further comprises a thumbnail display area configured to display a thumbnail extracted from the image,
the thumbnail displays event information corresponding to a selected point on the timeline, in accordance with the timeline,
the thumbnail displays a position within the thumbnail where the event occurs in a preset color or with preset shade corresponding to the type and number of occurrences of the event,
the display unit comprises an event detection module configured to detect an occurrence of an event from the image,
the event comprises motion detection, facial detection, and a camera event, and
the display unit displays the type of an event and a number of occurrences of an event on the timeline by using a first color for motion detection, a second color for facial detection, and a third color for a camera event displayed with a pixel of an n×n size at an event occurrence position on the timeline,
wherein when a plurality of events occur at the same time point, a plurality of pixels corresponding to the plurality of events are displayed not to overlap each other on the timeline corresponding to the same time point,
wherein when the number of events occurred at the same time point exceeds a predetermined number, pixels corresponding to events are displayed to overlap each other on the timeline.

2. The image providing apparatus of claim 1, wherein the event detection module is configured to receive coordinate information indicating an event occurrence position, and determine saturation or shade of the color by using the coordinate information that is accumulated.

3. The image providing apparatus of claim 1, wherein the display unit displays a thumbnail corresponding to a time period set by a user in the thumbnail display area, and displays an event change pattern that has occurred during the time period in the preset color or with the preset shade.

4. The image providing apparatus of claim 1, wherein the display unit further displays the type of an event and a detection frequency for each event type detected during a time period set by a user.

5. An image providing apparatus comprising:
an image storage unit configured to store an image obtained through a camera; and
a display unit comprising a display area configured to display the image stored in the image storage unit and a timeline area configured to display a timeline corresponding to a reproduction time of the image, and display a scale selection area for changing a scale of the timeline,
wherein, when the scale is equal to or less than a preset first scale, the display unit displays a color or shade corresponding to a number of events that have occurred in the image at an event occurrence position on the timeline,
wherein, when the scale is greater than the first scale, the display unit displays types of events that have occurred in the image in different colors on the timeline corresponding to time points when the events occurred,
wherein the display unit further comprises a thumbnail display area configured to display a thumbnail extracted from the image,
wherein the thumbnail displays event information corresponding to a selected point on the timeline, in accordance with the timeline,
wherein the thumbnail displays a position within the thumbnail where the event occurs in a preset color or with preset shade corresponding to the type and number of occurrences of the event,
wherein the display unit comprises an event detection module configured to detect an occurrence of an event from the image, and the event comprises motion detection, facial detection, and a camera event, and
wherein the display unit displays the type of an event and a number of occurrences of an event on the timeline by using a first color for motion detection, a second color for facial detection, and a third color for a camera event displayed with a pixel of an n×n size at an event occurrence position on the timeline,
wherein when a plurality of events occur at the same time point, a plurality of pixels corresponding to the plurality of events are displayed not to overlap each other on the timeline corresponding to the same time point, wherein when the number of events occurred at the same time point exceeds a predetermined number, pixels corresponding to events are displayed to overlap each other on the timeline.

6. The image providing apparatus of claim 5, wherein the event detection module is configured to receive coordinate information indicating an event occurrence position, and determine saturation or shade of the color by using the coordinate information that is accumulated.

7. The image providing apparatus of claim 5, wherein the display unit displays a thumbnail corresponding to a time period set by a user in the thumbnail display area, and displays an event change pattern that has occurred during the time period in the preset color or with the preset shade.

8. The image providing apparatus of claim 5, wherein the display unit further displays the type of an event and a detection frequency for each event type detected during a time period set by a user.

9. An image providing method using an image providing apparatus including a display area for reproducing an image and a timeline corresponding to a reproduction time of the image, the image providing method comprising:
  detecting an event from the image;
  determining a type and number of occurrences of a detected event;
  displaying, in different colors, types of events that have occurred in the image on the timeline corresponding to time points when the events have occurred; and
  displaying a thumbnail extracted from the image,
  wherein the thumbnail displays event information corresponding to a selected point on the timeline, in accordance with the timeline, and
  wherein the thumbnail displays a position within the thumbnail where the event occurs in a preset color or with preset shade corresponding to the type and number of occurrences of the event,
  wherein an event from the image comprises detecting an occurrence of motion detection event, a facial detection event, and a camera event, and
  wherein the timeline displays the type of an event and a number of occurrences of an event by using a first color for a motion detection event, a second color for a facial detection event, and a third color for a camera event displayed with a pixel of an n×n size at an event occurrence position on the timeline,
  wherein when a plurality of events occur at the same time point, a plurality of pixels corresponding to the plurality of events are displayed not to overlap each other on the timeline corresponding to the same time point,
  wherein when the number of events occurred at the same time point exceeds a predetermined number, pixels corresponding to events are displayed to overlap each other on the timeline.

10. The image providing method of claim 9, wherein, in the displaying of the thumbnail, a thumbnail corresponding to a time period set by a user is displayed, and an event change pattern that has occurred during the time period is displayed in the preset color or with the preset shade.

* * * * *